United States Patent [19]

Miyanaga

[11] Patent Number: 5,735,650
[45] Date of Patent: Apr. 7, 1998

[54] DRILL BIT FOR DRILLING AN UNDERCUT HOLE

[75] Inventor: Masaaki Miyanaga, Ashiya, Japan

[73] Assignee: Kabushiki Kaisha Miyanaga, Hyogo, Japan

[21] Appl. No.: 587,395

[22] Filed: Jan. 17, 1996

[30] Foreign Application Priority Data

Feb. 28, 1995 [JP] Japan ................... 7-040131

[51] Int. Cl.$^6$ .................................... B23B 29/034
[52] U.S. Cl. ................ 408/156; 408/147; 408/172; 175/286; 82/1.2
[58] Field of Search ..................... 408/153, 156, 408/157, 158, 159, 180, 147, 172; 82/1.2; 175/286, 267–270

[56] References Cited

U.S. PATENT DOCUMENTS

| 1,536,208 | 5/1925 | Gosper . | |
|---|---|---|---|
| 3,696,454 | 10/1972 | Youtz et al. | 408/153 X |
| 4,354,559 | 10/1982 | Johnson | 175/286 X |
| 4,402,642 | 9/1983 | Klancnik et al. | 414/18 |
| 4,462,726 | 7/1984 | Silvey et al. | 408/76 |
| 4,635,737 | 1/1987 | Miyanaga | 175/284 |
| 4,992,010 | 2/1991 | Fischer | 408/159 |
| 4,998,981 | 3/1991 | Miyanaga | 175/286 |
| 5,310,012 | 5/1994 | Centre et al. | 175/269 X |

FOREIGN PATENT DOCUMENTS

| 0 395 335 A1 | 10/1990 | European Pat. Off. . |
|---|---|---|
| 21 48 654 | 4/1972 | Germany . |
| 58-50855 | 11/1983 | Japan . |
| 63-150102 | 6/1988 | Japan . |
| 1-10173 | 3/1989 | Japan . |
| 1-18329 | 5/1989 | Japan . |
| 1-29646 | 6/1989 | Japan . |
| 2-39688 | 10/1990 | Japan . |
| 2-281907 | 11/1990 | Japan . |
| 4-11766 | 3/1992 | Japan . |
| 518688 | 5/1940 | United Kingdom . |
| 1184106 | 4/1968 | United Kingdom . |
| 1 345 923 | 2/1974 | United Kingdom . |
| 2 157 207 A | 10/1985 | United Kingdom . |

*Primary Examiner*—M. Rachuba
*Assistant Examiner*—Henry W. H. Tsai
*Attorney, Agent, or Firm*—Marshall, O'Toole, Gerstein, Murray & Borun

[57] ABSTRACT

A drill bit including a body, a drill bit fixed onto the body, a thrust transmitting member arranged on the body and having a contact portion, and an undercut cutting member housed in a guide groove provided in the side face of the drill bit. The undercut cutting member is freely movable and provided with an undercut edge at the lower end thereof. A pull-up spring is installed to operably move the undercut cutting member, and a working force transmitting mechanism is installed on the body coupled with the thrust transmitting member and with the undercut cutting member, to press down the undercut cutting member against the resistance of the pull-up spring by the approaching movement of the body and the thrust transmitting member thereby to cause the undercut cutting edge to protrude outwardly of the drill bit body surface.

3 Claims, 5 Drawing Sheets

DRILL BIT FOR DRILLING AN UNDERCUT HOLE

The present invention relates to a drill bit for drilling a hole of a predetermined depth in an object such as concrete and, at the same time, forms an undercut or flared portion at the bottom of the hole with a greater diameter.

BACKGROUND OF THE INVENTION

To plant an anchor bolt in a drilled object such as concrete, there has been utilized a technique wherein initially a hole of a predetermined depth is drilled in the object. A base portion of an anchor bolt is inserted into the drilled hole and includes a slitted cylindrical body, i.e., slitted on the outer circumference of the anchor bolt. The slits are cut in the axial direction so as to open and enlarge, thereby exerting frictional resistance with the wall of the hole.

Because the strength of the anchor bolt planted in the object, as described above, against a pull-out resistant force substantially varies depending on the bonding strength of the slitted cylindrical body with the hole wall near the bottom of the drilled hole, the pull-out resistant strength of the anchor bolt can be greatly increased by pre-cutting the wall of the drilled hole corresponding to the base portion of the embedded bolt to form an undercut or flared portion of greater diameter.

For this reason, various drill bits for drilling such undercut or flared hole portions have been proposed for initially drilling a hole of a predetermined depth in an object such as concrete by using an ordinary drilling tool such as a hammer drill, and then forming an undercut or flared hole portion by cutting near the bottom of the drilled hole.

The drill bits available for drilling such an undercut hole of the prior art described above have a drawback in that a hole with the undercut portion must be drilled in two discontinuous steps, because, first a hole is drilled by using an ordinary drilling tool, and then, the undercut portion is formed at the bottom of the drilled hole to form the undercut hole.

It is desired to solve the problems described above, and to provide a drill bit for drilling an undercut hole which is capable of drilling a hole of a predetermined depth in an object and, at the same time, form an undercut or flared portion at the bottom of the hole in a continuous operation.

SUMMARY OF THE INVENTION

A drill bit for drilling an undercut hole in an object according to the invention comprises a body having a shank, a drill bit projecting from the body, a thrust transmitting member adapted for slidable movement on the body and having a contact portion which comes into contact with the surface of an object to be drilled, a guide groove cut in the axial direction on the outer surface of the drill bit with a sloped surface formed at the lower end thereof, an undercut cutting member provided with an undercut cutting edge at the lower end thereof corresponding to the sloped surface, a pull-up spring installed in linkage with the undercut cutting member, and a working force transmitting mechanism which is installed on the body in linkage with the thrust transmitting member and with the undercut cutting member, to press down the undercut cutting member against the resistance of the pull-up spring by approaching movement of the body and the thrust transmitting member with respect to each other and to cause the undercut cutting edge to protrude outwardly of the drill bit outer surface.

In a drill bit for drilling an undercut hole the thrust transmitting member is formed of a cylindrical sleeve having a contact portion on the lower end thereof, the lower part of the body is fitted in the opening at the upper end of the cylindrical sleeve, a lock pin is provided on the body projecting thereon and engaged with an elongated hole made in the cylindrical sleeve. The pull-up spring is installed between the contact portion of the cylindrical sleeve and the upper end of the undercut cutting member, preferably with a plate engaged with the upper end of the undercut cutting member. A working force transmitting mechanism is formed by housing a plurality of balls consecutively in an inverse U-shaped hole made in the body to form a train of balls, and including a pair of connecting rods projecting downwardly of the body to make contact with respective ends of the train of balls, the lower end of one of the connecting rods is brought into contact with the contact portion of the cylindrical sleeve, while the lower end of the other connecting rod is brought into contact with the undercut cutting member or with the plate engaging the undercut cutting member.

The drill bit for drilling an undercut hole in an object includes an undercut marker, having a marking edge on the bottom face of the plate which is engaged with the upper end of the undercut cutting member. A communicating hole is drilled in the contact portion of the cylindrical sleeve aligned with the undercut marker, and the marking edge is adapted to freely protrude from and retract into the communicating hole.

In another embodiment of a drill bit for drilling an undercut hole in an object, the thrust transmitting member is constituted by forming the contact portion at the lower end of the cylindrical sleeve, the upper end of the cylindrical sleeve is slidably fitted between an oil case attached on the body and a cylinder is provided on the body concentrically with the oil case to form a first working oil chamber. A working force transmitting sleeve is slidably fitted between the cylinder and the body of the drill bit to form a second working oil chamber, and the second working oil chamber and the first working oil chamber are made to communicate with each other via an oil passage hole drilled through the cylinder. The lower end of the working force transmitting sleeve is engaged with the undercut cutting member so that the above constitutes the working force transmitting mechanism.

In operating the drill bit of the present invention for drilling an undercut hole in an object, a hole is drilled by the drill edge of the drill bit until the contact portion of the thrust transmitting member makes contact with the surface of the object to be drilled. When the contact portion of the thrust transmitting member makes contact with the surface of the object to be drilled and the downward movement of the thrust transmitting member stops, approaching movement of the body toward the thrust transmitting member presses the undercut cutting member downward against the resistance of the pull-up spring via the working force transmitting mechanism, thereby protruding the undercut cutting edge outwardly of the drill bit surface from the sloped surface of the guide groove and forming an undercut or flared portion at the bottom of the drilled hole.

The contact portion makes contact with the surface of the object to be drilled and the body continues to move down relative to the cylindrical sleeve to the extent allowed by the elongated hole. During this operation, the connecting rod making contact with the contact portion enters in the body to move the train of balls housed in the inverse U-shaped hole, so that the movement of the train of balls presses another connecting rod out of the body downward to press down the undercut cutting member, thereby forming the undercut portion by means of the undercut cutting edge.

As the undercut cutting member is forced down, the engaged plate moves down in the cylindrical sleeve so that the undercut marker passes through the communicating hole drilled in the contact portion of the cylindrical sleeve and the marking edge protrudes below the contact portion to cut a circular line on the surface of the object to be drilled. It can be confirmed that the undercut portion has been cut, by observing this circular line.

In operating the drill bit of the second embodiment of the invention, when the contact portion makes contact with the surface of the object to be drilled and the downward movement of the cylindrical sleeve stops, working oil in the first working oil chamber is pressed at the upper end of the cylindrical sleeve and moves through the oil passage hole to the second working oil chamber, so that the movement of the working oil to the second working oil chamber presses down the working force transmitting sleeve and the undercut cutting member, thereby forming the undercut portion by means of the undercut cutting edge.

BRIEF DESCRIPTION OF THE DRAWINGS

Preferred embodiments of the invention will be described below referring to the accompanying drawings.

DETAILED DESCRIPTION

Figure 1:
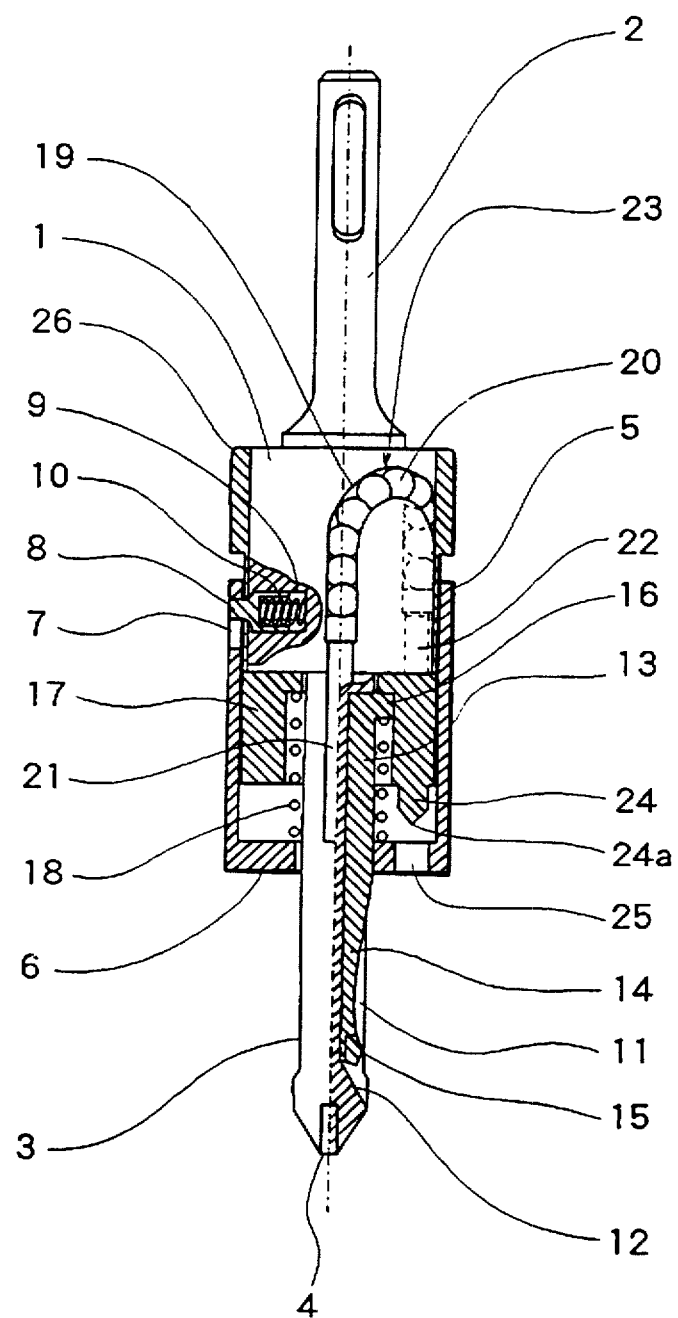
FIG. 1 is an elevational view partly in section of a drill bit according to a first embodiment of the invention.

FIG. 1 shows a body 1 having a shank 2 which is to be connected to a drive spindle (not shown), provided at the center of the top face thereof and a drill bit 3 fixed at the center of the bottom face thereof. A drill edge 4 provided on the bottom of the drill bit 3 is the same as that of a known drilling tool for drilling an ordinary straight hole.

A cylindrical sleeve 5 is adapted to be freely movable in the vertical direction relative to the body 1, with a contact portion 6 which makes contact with the surface of an object to be drilled being formed at the lower end thereof. The lower part of the body 1 is slidably fitted in an upper opening of the cylindrical sleeve 5, and a lock pin 8 is provided to project on the body portion 1 so as to be engaged in an elongated hole 7 made in the cylindrical sleeve 5 to selectively regulate the range of vertical movement of the body 1 and the cylindrical sleeve 5. The lock pin 8 is held in a holding hole 9 made in the body portion 1 and made to project into the elongated hole 7 under the pressure of a spring 10, thereby enabling separation of the body 1 and the cylindrical sleeve 5 by pressing the lock pin 8 into the holding hole 9 against the resistance of the spring 10.

A guide groove 11 is provided on the side face of the drill bit 3 by cutting therein in the axial direction. The guide groove 11 has a sloped surface 12 formed at the bottom thereof to slope outwardly and extending to the drill bit outer surface.

An undercut cutting member 13 housed in the guide groove 11 is freely movable within a predetermined range relative to the drill bit 3. The lower half of the undercut cutting member 13 includes a blade 14 which has an appropriate degree of elasticity with an undercut cutting edge 15 being provided at the lower end thereof corresponding to the sloped surface 12 of the guide groove 11. An outwardly projecting support portion 16 is provided at the upper end of the undercut cutting member 13.

A plate 17 is provided to be slidably mounted in the cylindrical sleeve 5 and engaged with the support portion 16 of the undercut cutting member 13, with a pull-up spring 18 being arranged between the plate 17 and the contact portion 6 of the cylindrical sleeve 5. Under normal conditions, the undercut cutting member 13 is pulled up by the spring 18 together with the plate 17 relative to the drill bit 3 to retract the undercut cutting edge 15 into the guide groove 11, and so that the plate 17 makes contact with the bottom face of the body 1 under the pressure of the pull-up spring 18.

An inverse U-shaped hole 19 is provided in the body 1 with a plurality of balls 20 being housed consecutively in the inverse U-shaped hole 19 to form a train of balls 20, while connecting rods 21, 22 are provided to project downwardly of the body 1 to make contact with respective ends of the train of balls 20, so that the lower end of one connecting rod 21 is brought into contact with the contact portion 6 of the cylindrical sleeve 5, and the lower end of the other connecting rod 22 is brought into contact with the plate 17, thereby forming a working force transmitting mechanism 23.

An undercut marker 24 is provided on the bottom face of the plate 17 near the periphery of the plate 17 to project downward, and includes a marking blade 24a at the lower end. A communicating hole 25 is provided in the contact portion 6 of the cylindrical sleeve 5 aligned with the undercut marker 24 so that, when the plate 17 moves down in the cylindrical sleeve 5, the undercut marker 24 passes through the communicating hole 25 thereby enabling the marking edge 24a to project below the contact portion 6.

A cover 26 is attached on the outer circumference of the body 1, for stabilizing the lock pin 8 and the train of balls 20 in the body 1.

Operation of the drill bit shown in FIG. 1 and configured as described above will be described below with reference to FIGS. 2 and 3.

Figure 2:
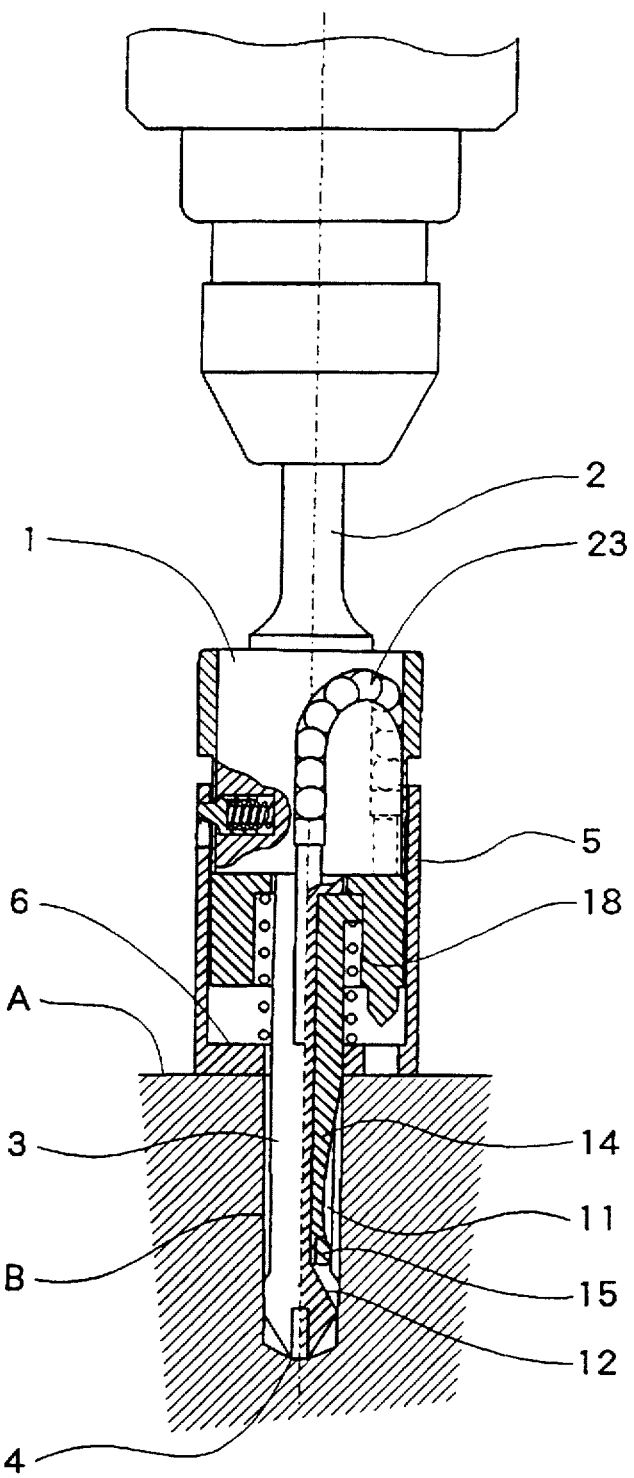
FIG. 2 is an elevational view partly in section illustrating the drill bit of FIG. 1 during an initial hole drilling operation.

Referring to FIG. 2, the drill edge 4 of the drill bit 3 is pressed against the object A to be drilled to drill a drilled hole B. The drilled hole B reaches a predetermined depth determined by the contact portion 6 of the cylindrical sleeve 5 making contact with the surface of the object to be drilled A.

Figure 3:
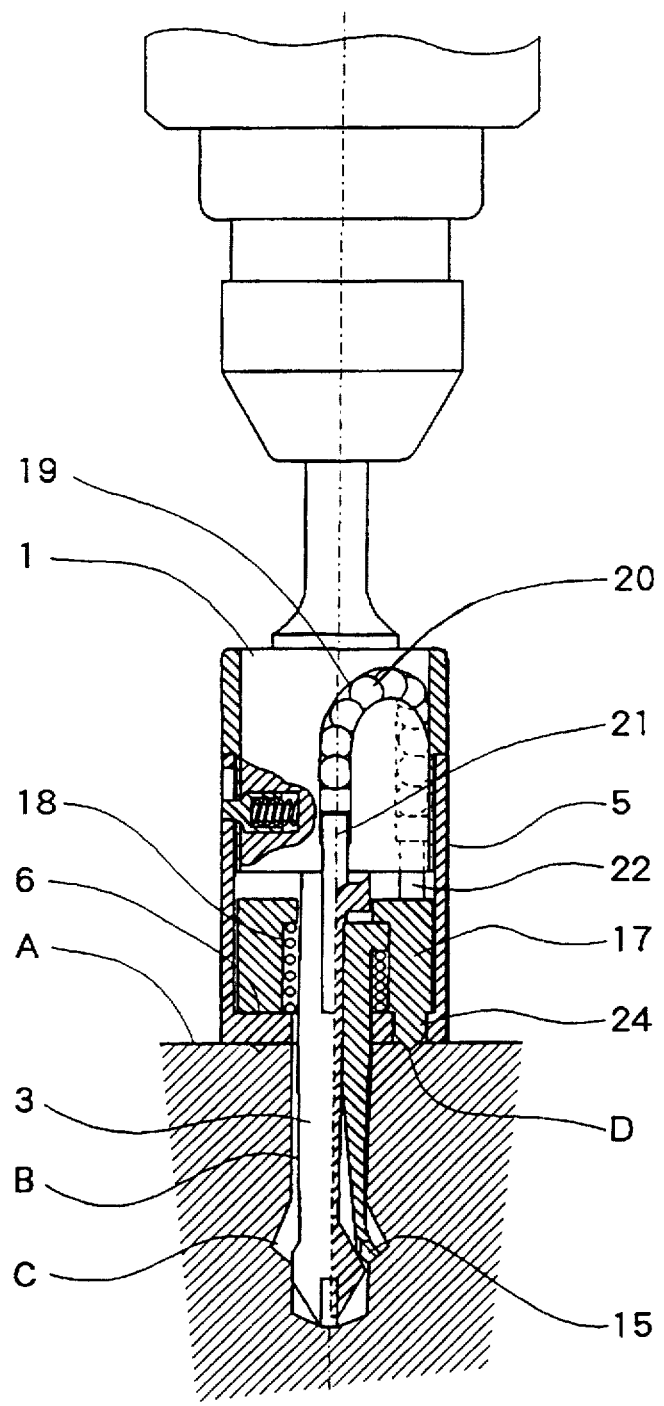
FIG. 3 is an elevational view partly in section illustrating the drill bit of FIG. 1 during a further undercut portion forming operation.

Referring to FIG. 3, after the contact portion 6 of the cylindrical sleeve 5 has made contact with the surface of the object to be drilled A, the body 1 is thrust into the cylindrical sleeve 5 and continues to move down so that drilling of the drilled hole B continues.

Because the connecting rod 21 which is in contact with the contact portion 6 of the cylindrical sleeve 5 stops its downward movement along with the cylindrical sleeve 5, the connecting rod 21 is thrusted into the inverse U-shaped hole 19 made in the body 1 to move the train of balls 20, so that the movement of the train of balls 20 forces the connecting rod 22 out of the body 1 and downward, thereby pressing down the plate 17.

Thus the plate 17 is pressed down together with the undercut cutting member 13 over a greater distance than the downward movement of the body 1 against the resistance of the pull-up spring 18, and the undercut cutting edge 15 moves along the sloped surface 12 of the guide groove 11 to protrude outwardly of the drill bit 3 surface and starts cutting of the drilled hole wall.

Eventually the plate 17 comes into contact with the contact portion 6 and the downward movement of the undercut cutting member 13 stops so that, at this time, the undercut cutting edge 15 reaches the point of maximum protrusion on the drill bit 3 surface, to complete cutting of the undercut portion C where the wall of the hole is tapered to enlarge the diameter downward. Also when cutting of the undercut portion C is completed, the marking edge 24a of the undercut marker 24 protrudes from the communicating hole 25 downwardly of the contact portion 6 and is pressed against the surface of the object to be drilled A, thereby marking a circular line D on the surface of the object to be drilled A. Completion of the undercut portion C cutting process can be confirmed by observing the circular line D.

When cutting of the undercut portion C is completed and the force to thrust the drill bit into the drilled hole is removed, the process proceeds in reversed order of the procedure described above. The pull-up spring 18 pulls up the plate 17 and the undercut cutting member 13 and, at the same time, the cylindrical sleeve 5 returns to the initial position while the undercut cutting edge 15 retracts into the guide groove 11 and the drill edge 3 is pulled out of the drilled hole B to complete the drilling operation.

As described above, the circular line D marked on the surface of the object to be drilled A provides a variety of information even after the drilling operation has been completed. For example, existence of the circular line D means that the hole is a drilled hole B with an undercut portion C being cut therein. When the radius of the circular line D is given a relationship with the depth of the drilled hole B or the position of the undercut portion C, it provides convenience in selecting the type of anchor bolt to be planted and other purposes.

Figure 4:
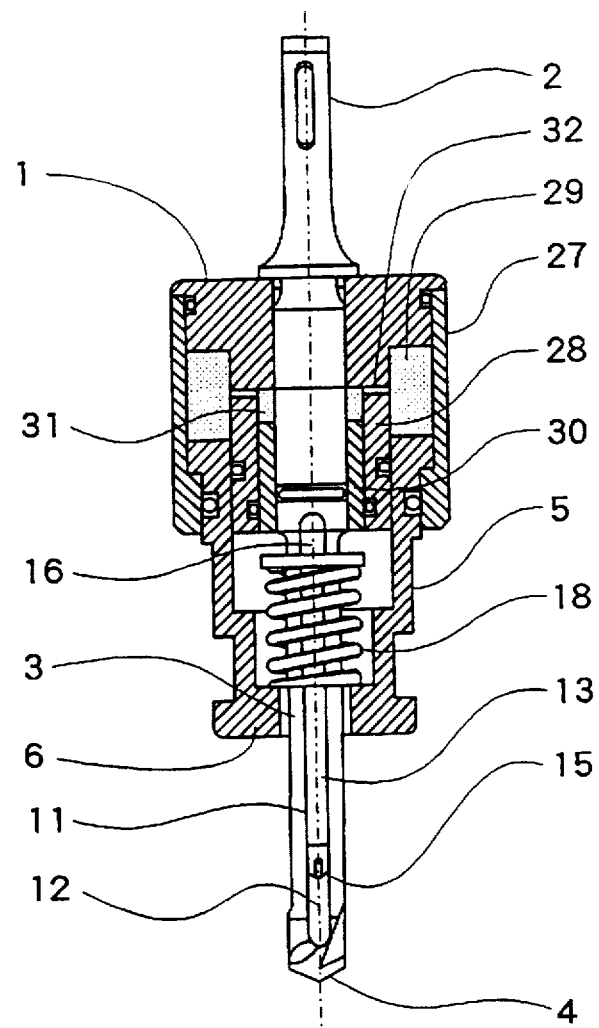
FIG. 4 is an elevational view partly in section illustrating a drill bit according to a second embodiment of the invention.

A second embodiment of an undercut hole forming drill bit is shown in FIG. 4. Referring to FIG. 4, the components identical with those shown in FIG. 1 are given the same numerals and repetition of the same description will be avoided.

In this second embodiment, the movement of working oil is used to operate the working force transmitting mechanism.

Referring to the second embodiment shown in FIG. 4, an oil case 27 is attached to the body 1 with a cylinder 28 being installed suspended on the body 1 and concentrically in the oil case 27. The upper end of the cylindrical sleeve 5 is adapted to slidably fit between the oil case 27 and the cylinder 28 so as to form a first working oil chamber 29. A working force transmitting sleeve 30 is adapted to slidably fit between a cylindrical portion 28 and the drill bit 3 to form a second working oil chamber 31, while an oil passage hole 32 is provided to penetrate through the upper part of the cylinder 28 so that the first working oil chamber 29 and the second working oil chamber 31 communicate with each other. The lower end of the working force transmitting sleeve 30 is engaged with the support portion 16 of the undercut cutting member 13 thereby constituting a working force transmitting mechanism.

Figure 5:
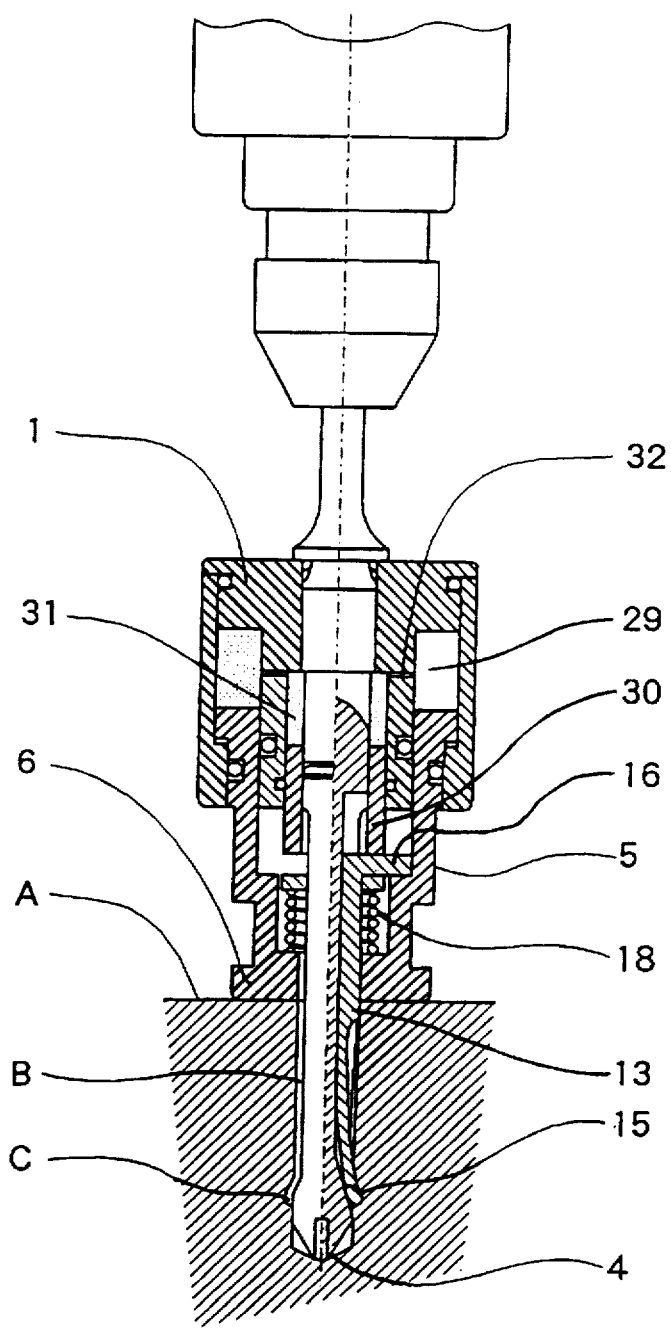
FIG. 5 is an elevational view partly in section illustrating the drill bit of FIG. 4 during a hole undercut portion forming operation.

In a drilling operation, as shown in FIG. 5, the drill edge 4 of the drill bit 3 is pressed against the object to be drilled A to drill the drilled hole B and, after the contact portion 6 of the cylindrical sleeve 5 makes contact with the surface of the object to be drilled A, the upper end of the cylindrical sleeve 5 is thrusted into the first working oil chamber 29 to move the working oil from the first working oil chamber 29 via the oil passage hole 32 into the second working oil chamber 31, thereby pressing down the working force transmitting sleeve 30.

Thus the working force transmitting sleeve 30 is pressed down together with the undercut cutting member 13 over a greater distance than the downward movement of the body 1 against the resistance of the pull-up spring 18, and the undercut cutting edge 15 moves along the sloped surface 12 of the guide groove 11 to protrude outwardly of the drill bit 3 surface and create the undercut portion C.

The invention configured as described above provides the following results and significant advantages over prior devices.

(1) In a drilling operation, an undercut portion can be formed smoothly and surely because, after the thrust transmitting member has made contact with the surface of the object to be drilled, the continued forcing of the body downward relative to the thrust transmitting member is converted to the press-down movement of the undercut portion cutting member to increase the distance of pressing down the undercut cutting member, thereby causing the undercut blade to protrude outwardly of the drill bit surface.

(2) An undercut hole can be drilled easily and efficiently in an operating procedure substantially the same as that of the conventional straight hole drilling operation, because drilling of a drilled hole of a predetermined depth as a primary hole for planting an anchor bolt and forming of an undercut portion at the bottom of the drilled hole can be carried out continuously in a single process.

Also because a variety of information representing the configuration in the hole is obtained from the circular line marked on the surface of the object to be drilled, selective use of the anchor bolt to be planted can be done appropriately and anxiety about the pull-out resistant strength during the use of the anchor bolt can be eliminated.

The foregoing detailed description has been given for clearness of understanding only, and no unnecessary limitations should be understood therefrom, as modifications will be obvious to those skilled in the art.

What is claimed is:

1. A drill bit for drilling an undercut hole in an object, comprising:
   a body having a shank at one end;
   a drill bit projecting from the other body end;
   a thrust transmitting member adapted for slidable movement on the body and having a contact portion which comes into contact with the surface of the object to be drilled;
   a guide groove extending axially in the outer surface of the drill bit and having a sloped surface formed at the bottom thereof;
   an undercut cutting member movably mounted in the guide groove and including an undercut cutting edge at the bottom thereof corresponding to the sloped surface;
   a pull-up spring coupled to the undercut cutting member;
   a working force transmitting mechanism coupled intermediate the thrust transmitting member and the undercut cutting member, to press down the undercut cutting member against the resistance of the pull-up spring in response to movement of the body and the thrust transmitting member with respect to each other thereby causing the undercut cutting edge to protrude outwardly of the drill bit outer surface;
   the thrust transmitting member includes a cylindrical sleeve including an upper end, the contact portion at the sleeve bottom, and an elongated hole in the sleeve;

the body includes a lower portion adapted to fit inside the upper end of the cylindrical sleeve;

a lock pin projecting from the body and engageable with the elongated hole in the cylindrical sleeve;

the pull-up spring is mounted between the contact portion of the cylindrical sleeve and the undercut cutting member; and the working force transmitting mechanism includes
- (1) a plurality of balls housed consecutively in an inverse U-shaped hole made in the body to form a train of balls,
- (2) a pair of connecting rods projecting from the body to make contact with respective ends of the train of balls, the lower end of one of the connecting rods engageably contacting the contact portion of the cylindrical sleeve, and the lower end of the other connecting rod engageably contacting the undercut cutting member.

2. A drill bit for drilling an undercut hole in an object according to claim 1, including an undercut marker having a projecting marking edge, the undercut marker operatively coupled with the upper end of the undercut cutting member;

the contact portion of the cylindrical sleeve includes a communicating hole aligned with the undercut marker; and the marking edge adapted to freely protrude from and retract into the communicating hole below the contact portion.

3. A drill bit for drilling an undercut hole in an object, comprising:

a body having a shank at one end;

a drill bit projecting from the other body end;

a thrust transmitting member adapted for slidable movement on the body and having a contact portion which comes into contact with the surface of the object to be drilled;

a guide groove extending axially in the outer surface of the drill bit and having a sloped surface formed at the bottom thereof;

an undercut cutting member movably mounted in the guide groove and including an undercut cutting edge at the bottom thereof corresponding to the sloped surface;

a pull-up spring coupled to the undercut cutting member;

a working force transmitting mechanism coupled intermediate the thrust transmitting member and the undercut cutting member, to press down the undercut cutting member against the resistance of the pull-up spring in response to movement of the body and the thrust transmitting member with respect to each other thereby causing the undercut cutting edge to protrude outwardly of the drill bit outer surface;

an oil case surrounding the body;

the thrust transmitting member includes a cylindrical sleeve including an upper end and the contact portion at the sleeve bottom;

a cylinder provided on the body concentrically with the oil case and the upper end of the cylindrical sleeve is adapted to slidably fit between the oil case and the cylinder, thereby forming a first working oil chamber;

a working force transmitting sleeve is slidably fitted between the cylinder and the drill bit, thereby forming a second working oil chamber;

the second working oil chamber and the first working oil chamber communicating with each other via an oil passage hole drilled through the cylinder;

a working oil contained in the first and the second working oil chambers; and the lower end of the working force transmitting sleeve is engaged with the undercut cutting member to constitute the working force transmitting mechanism.

* * * * *